(12) United States Patent
Wagner et al.

(10) Patent No.: US 8,918,495 B2
(45) Date of Patent: Dec. 23, 2014

(54) LINK TRACKING

(75) Inventors: Dirk P. Wagner, Schiffweller (DE); Jens O.J. Weidner, Nussloch (DE)

(73) Assignee: SAP SE, Walldorf (DE)

( * ) Notice: Subject to any disclaimer, the term of this patent is extended or adjusted under 35 U.S.C. 154(b) by 991 days.

(21) Appl. No.: 11/245,607

(22) Filed: Oct. 6, 2005

(65) Prior Publication Data

US 2007/0083640 A1    Apr. 12, 2007

(51) Int. Cl.
*G06F 15/173*    (2006.01)
*H04L 12/26*    (2006.01)

(52) U.S. Cl.
CPC ............ *H04L 12/2602* (2013.01); *H04L 43/00* (2013.01)
USPC .......................................... 709/224; 709/203

(58) Field of Classification Search
CPC ..... H04L 43/00; H04L 12/2602; H04L 12/00; H04L 12/02; H04L 12/26
USPC ................... 709/203, 201, 224, 223
See application file for complete search history.

(56) References Cited

U.S. PATENT DOCUMENTS

| | | | |
|---|---|---|---|
| 6,466,966 B1 * | 10/2002 | Kirsch et al. | 709/203 |
| 7,062,475 B1 * | 6/2006 | Szabo et al. | 706/11 |
| 2007/0011340 A1 * | 1/2007 | Seidl et al. | 709/228 |

* cited by examiner

*Primary Examiner* — William Goodchild
(74) *Attorney, Agent, or Firm* — Kenyon & Kenyon LLP

(57) ABSTRACT

Link tracking includes generating an electronic communication with links providing for a destination URL and a target URL. Upon selection of the active link, a destination site is accessed, based on the destination URL. In the destination site, the tracking information associated with the incoming data access request is parsed off. This tracking information may then be stored in a database or business warehouse for monitoring the response from the electronic communication. Also, a target site is determined based on the tracking information. The destination site thereupon redirects the access request to the target site, providing for the access to the target site to be to directed back to the user and not through the destination site. Therefore, the user may access the target web site based on the electronic communication and this activity can be tracked through the destination site.

24 Claims, 3 Drawing Sheets

LINK TRACKING

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

The present invention relates generally to tracking user activity in online transactions and more specifically to tracking user selection of one or more active links.

Tracking a user's activity can be important for managing different transactions. For example, with multiple users, it may be beneficial to track where different users traverse within different web sites. This tracking may be used to better design and layout a web site, as well as monitor how the user is using the web site or responding to various advertising approaches.

In another example, it is important to know from where users linked into the particular web site. There currently exists known universal resource locator (URL) tracking techniques that monitor how a person accesses a particular web site. These techniques provide for referral allocation, such as found within advertising on a secondary web page, e.g. a search engine. In one technique, an active URL may include the URL portion for the intended web site and a secondary portion having a reference identifier. In this technique, when a user selects the active hyperlink, the destination web site parses off the second portion for tracking information.

In a further technique, the URLs within the destination web page may also be dynamically created to include the reference information. In this technique, when a user selects one of the links on the destination page, any further web pages within the web site will also include a reference identifier. This may be advantageous for tracking referral fees for any subsequent online purchases.

The existing techniques are limited because the tracking information is available only to the destination web site. Once a user selects the active hyperlink, the linking activity information may be stored on computers associated with the destination web site, but these links are also only customizable as allowed by the referring web site. For example, if the referring web site is a search engine, any customization by the target web site with URLs or tracking information may be problematic because the target web site would require the search engine to adjust its encoding. In systems having multiple advertisers and with companies having multiple advertising campaigns, tracking all this information is not only cumbersome, but is also readily error prone.

With the growth of web activities, companies may employ multiple different web sites under multiple URLS. While these sites may include a fair amount of common information, it is possible to even further personalize these web sites for particular users. One approach is using different URLs and directing different users to different URLs. For example, a company may sell pet food and wish to direct dog lovers to a dog food web site and cat lovers to a cat food web site. In existing systems, the referring web site would have to either include both referring URLs or require the user to select one or the other, or the referring web site would have to know the user's pet preference for either a cat or a dog.

The above example is also limited based on only two different pet food options. Scenarios exist where there are a significant number of options, such as with professional sports teams. These techniques are applicable to directed advertising approaches. Although, these techniques may be ineffective when using referring active links and tracking of user information through these referring sites because the referring site does not necessarily provide the user with the appropriate URL based on the referring sites lack of proper knowledge of which URL to present to the user.

DETAILED DESCRIPTION

Multiple link tracking is provided through the dynamic adjustment of URLs through directed electronic communications. Through the inclusion of tracking information and designated target URL addresses, a user may be properly directed to the target web site or through a destination site that can track the user's activity. As used herein, the target site refers to an intended site that a particular uses wishes to access by clicking on an active link and the destination site may be an intermediate site where the user is actually directed prior to accessing the target site.

Figure 1:
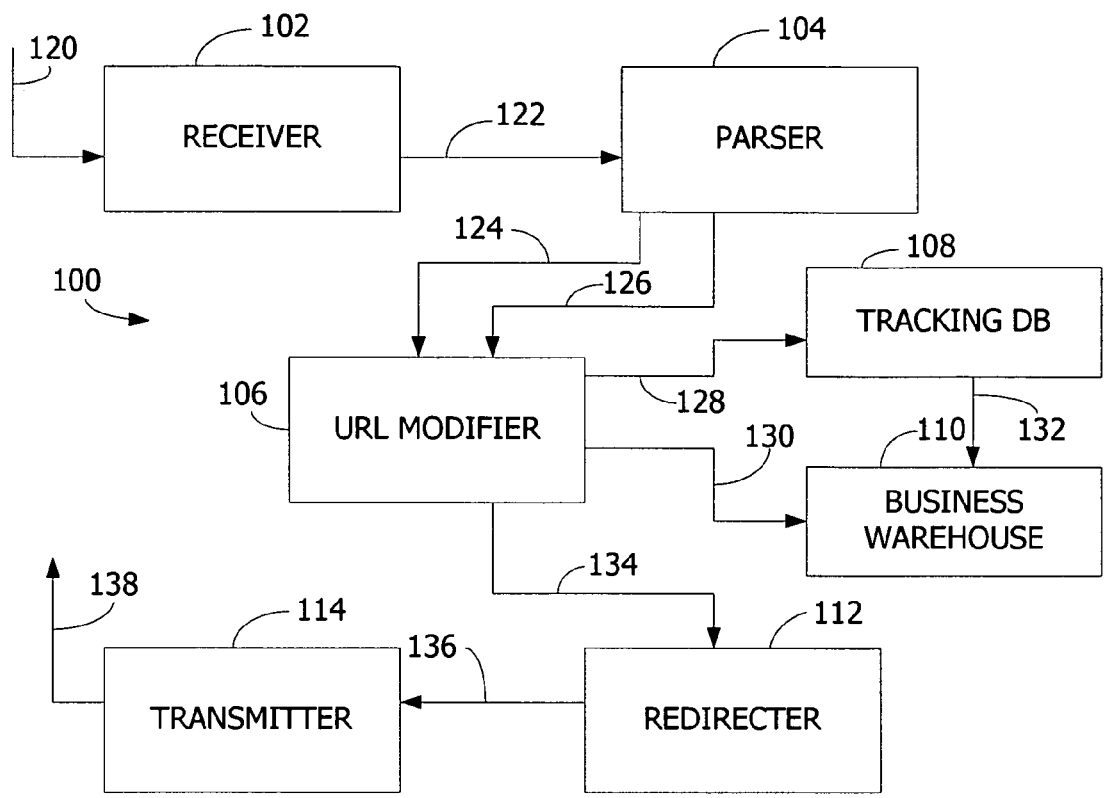
FIG. 1 illustrates a block diagram of one embodiment of an apparatus for tracking link access in a processing system.

FIG. 1 illustrates one embodiment of an apparatus 100 for tracking incoming link access. The apparatus 100 includes a receiver 102, a parser 104, a URL modifier 106, a tracking database 108, a business warehouse storage device 110, a redirection device 112 and a transmitter 114. These elements may be associated with, peripheral to, or included within a processing system, such as a database application or a customer resource management application. The elements may be implemented in hardware, software or a combination thereof for performing the below-noted operations.

In one embodiment, the receiver 102 receives an incoming user request 120. This request 120 may be generated by a user selecting an active link in an electronic document, electronically requesting a particular URL through a browser application or any other suitable technique. The receiver 102 extracts a data field from the incoming user request 120, the data field 122 includes a destination URL and tracking information. For example, the destination URL may be the URL of the target web site, such as www.target.com. The tracking information is information used to indicate the location of the incoming user request 120 and the corresponding user activity. The tracking information may also provide reference for other information as recognized by one skilled in the art.

The data field 122 having the destination URL and the tracking information is provided to the parser 104. The parser 104 separates these different elements, such that the destination URL 124 and the tracking information 126 are provided to the URL modifier 106. The modifier 106, in response to the tracking information 126 provides at least a portion of tracking information 128 to the tracking database 108. The tracking information may include reference to the target URL.

In one embodiment, the URL modifier 106 is also in communication with a business warehouse 110, which may be a more general processing environment that includes functions for tracking the linking activities of the incoming user requests 120. Through the business warehouse 110, further tracking information 130 may be received from the URL modifier 106, such as the date and of the user request 120, the location of where the request 120 was generated, a length of time between when the user was presented with an electronic document (as discussed further below) and when the request was generated 120, or any other suitable tracking information.

It is further envisioned that in one embodiment, the tracking database 108 may also provide tracking database information 132 to the business warehouse 110 for the exchange or sharing of information therebetween. Moreover, the business warehouse 110 may an Online Analytical Processing device or an Online Transaction Processing device within a CRM system.

The URL modifier 106 thereupon creates the target URL for the user to access the target location. In one embodiment, the user access 120 is received by the receiver 102 through routings to the destination URL, which may not necessarily be the same URL as the target URL. For example, the apparatus 100 of FIG. 1 may be in an intermediate system that receives and redirects the user access 120 for extracting the tracking information. Therefore, in order to fulfill the user access request 120, the intended information must still be retrieved.

The target URL may be generated based on the tracking information because, as discussed in further detail below, the tracking information is generated with respect to one or more designated URLS. In another embodiment, the destination URL may include a redirect portion including the URL, such as appended to the tracking information, for example the URL www.web_site.com/## . . . /redirect=target_site. Other suitable techniques for providing redirection information are also envisioned.

The URL modifier 106 generates a modified URL request 134 that is provided to the redirector 112. The redirector 112 must also provide for the subsequent access request to be transmitted not back to the apparatus 100, but rather to the location from where the incoming access request 120 was received, such as a user's computer or designated computing node. In other words, the apparatus 100 should be transparent to a user, whereby the user sends the request 120 and receives the requested information from a target site.

The redirect service 112, using the target URL and the identity of the location of the user, submits a data access request 136 to the transmitter 114. The transmitter 114 access 138 the designated target URL with instructions for the target URL data to be transmitted directly to the user. In another embodiment, the transmitter 114 may establish a connection between the user the target web site for data to be transmitted therebetween.

When the transmitter 114 access 138 the designated target URL, the user receives its requested information and the tracking database 108 and/or the business warehouse 110 tracks the users access to the target URL. From this tracking information, back end systems may thereupon use this information for reporting or monitoring techniques. Through the collection of the tracking information, user activities may be readily discerned without burdening the user or a target web site.

Figure 2:
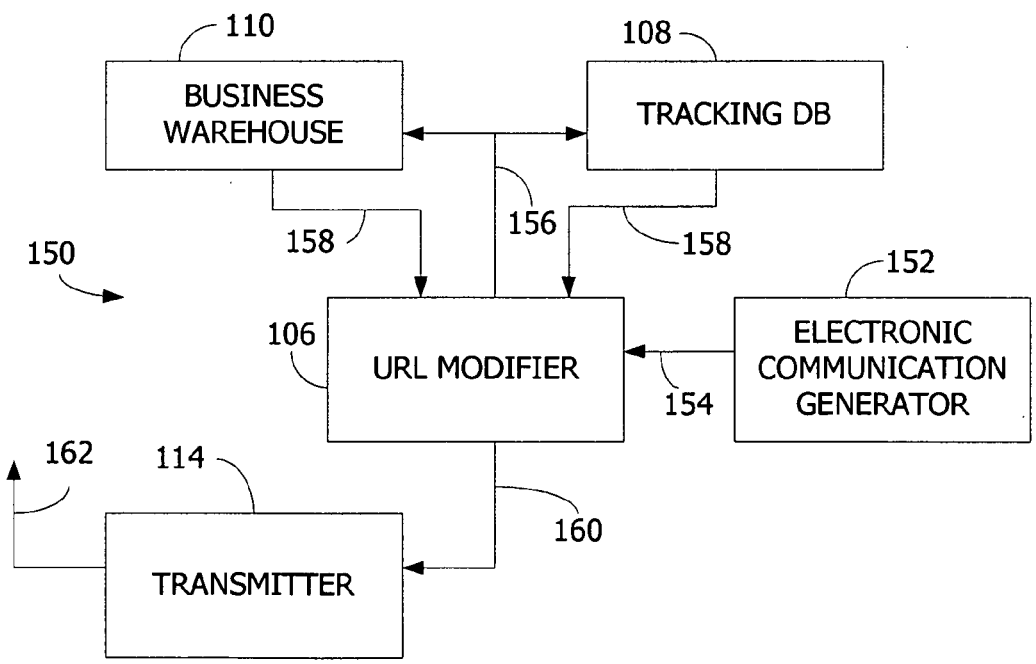
FIG. 2 illustrates a block diagram of another embodiment of an apparatus for tracking link access in a processing system.

FIG. 2 illustrates another embodiment of an apparatus 150 allowing for tracking URLS. The apparatus 150 provides for the insertion of the corresponding tracking information as usable by the apparatus 100 of FIG. 1. The apparatus 150 includes the business warehouse 110, the tracking database 108, the URL modifier 106, an electronic communication generator 152 and the transmitter 114.

The electronic communication generator 152 generates a plurality of electronic communications 154 that are provided to the URL modifier 106. These electronic communications may be electronic mail, wireless messages (e.g. SMS), pages or other types of electronic messages. The generator 152 may use a form database or other device for generating these messages 154. The messages 154 are directed to intended customers and may are based on previously known information about the intended recipients. This information may be stored within the business warehouse 110, the tracking database 108 or any other suitable location.

With the information regarding the intended recipient, the URL modifier adjusts the embedded URLs within the electronic communication to allow for further tracking. For example, URL modifier 106 may include designated run-time identifiers, such as "##" or "**" symbols attached to a corresponding URL, or may include redirection information for various active links. The URL modifier 106 submits an identification 156 to either or both of the business warehouse 110 and the tracking database 108. In response thereto, user information 158 is provided to the URL modifier 106. Based on this user information 158, the URL modifier 106 inserts the appropriate tracking and URL information.

The URL modifier 106 and the generator 152 may be used to generate a large scale communication distribution, such as a mass emailing of individualized emails. The recipients receive personalized emails directed to their particular interests. For example, if the communication was generated by a pet food manufacturer to users that have offered their email addresses and filled out information, the emails could be personalized regarding the customer's type of pet. Some customers could be offered specials on dog food and dog specific magazines, while others could be offered specials on cat food and cat specific magazines. While all this information may be contained on a specific web site or web domain, the electronic communications 154 can be personalized for the specific customers with associated tracking information.

After the electronic communication 154 is personalized by the URL modifier 106, the customer-specific messages 160 are provided to the transmitter 114 and transmitted messages 162 are directed to the individual users. The transmitted messages 162 include the corresponding routing information, such as an email address or a telephone or pager number as well as the electronic communication associated therewith.

Figure 3:
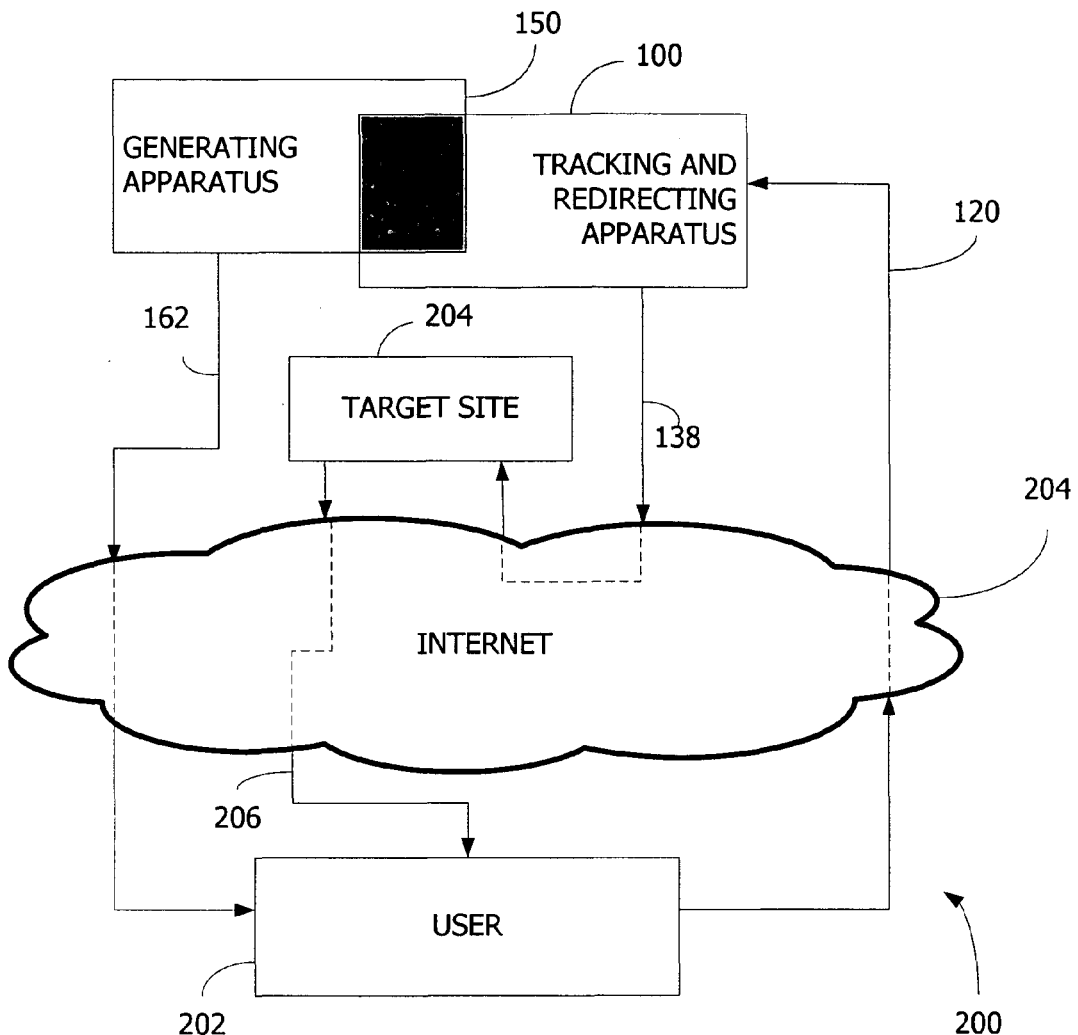
FIG. 3 illustrates a block diagram of a system using the apparatuses of FIGS. 1 and 2.

In one embodiment, the apparatus 100 of FIG. 1 and apparatus 150 of FIG. 2 are included within a common operating platform. FIG. 3 illustrates a system 200 including the apparatus 100 and the apparatus 150, which are illustrated in overlap fashion to represent that both apparatuses may include common elements. As recognized by one having ordinary skill in the art, the apparatuses 100 and 150 may have separate and distinct elements in there own operating platforms, which may be at separate physical locations on separate computing devices or systems.

The generating apparatus 150 provides the electronic communications 162 to a user 202. In one embodiment, these communications 162 are transmitted across a network, such as the internet 204. In other embodiments, they may be transmitted across wireless or wired communication networks or other suitable communication means.

The user 202, upon receipt of the communication 162 may select a particular embedded link. Using known protocols, the selecting of the link provides the incoming user request 120 to be directed to the apparatus 100. In one embodiment, this is performed by designating a corresponding protocol address for the apparatus 100, even though the user 202 may believe they are intended to directly access a target site 204.

In accordance with operations describe above with respect to FIG. 1, the apparatus 100 thereby tracks the user's 202 activity to access the target site 204 and provides a redirected access request 138 to the target site 204, through the internet 204. As discussed above, the request 138 includes instructions to redirect the target site access 206 to the user 202, instead of redirecting the target site 204 information back to the apparatus 100. In other words, the request 138 may be a data push command to push the data 206 to the user 202 instead of a typical data pull command to pull data back to the requesting site.

The user 202 therefore then receives the data 206 from the target site 204, which may be a program or mark-up language composition executed or compiled on a browser or other viewing application. In the above example of a marketing campaign directed to pet food, the target site 204 may be an online retailer that is selling dog food at a discounted price for a short period of time. The promotional information is provided to the user 202 through the internet 206 and a normal exchange of data may be conducted between the user 202 and the target site 204 to complete any online transaction.

The apparatus 150 provides directed marketing with embedded active links to the user 202. The apparatus 100 received a command requesting access to a target site 204 and parsed off information to track the user's 202 accessing the target site 204. As described above, the apparatus 100 may be a destination site for the URL with tracking information and the apparatus 100 provides for redirecting to the target site 204. From this tracking information, the success of the campaign may be monitored. It is also noted that monitoring may include tracking not only individual URLS, but groups of URLS. For example, not can links to dog food be tracked, but all links related to canine interests can be grouped together and collectively tracked. The identification of the URL may be a type of tracking object and based on the type of object, they can be grouping into tracking object groups. Therefore, based on tracking objects, tracking object groups can provide various levels of specificity in monitoring the campaign.

Figure 4:
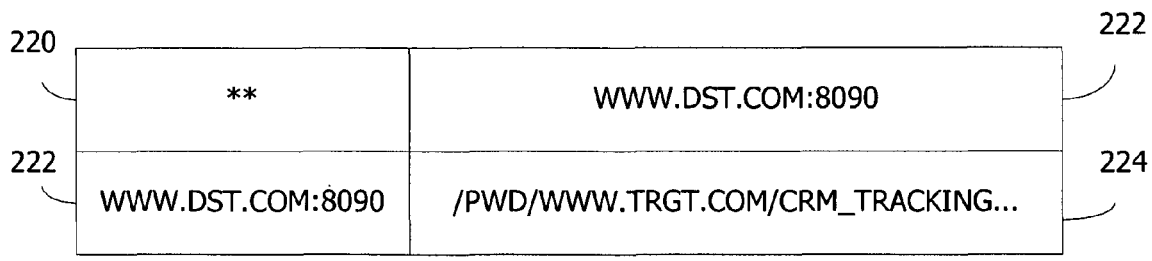
FIG. 4 illustrates a graphical representation of one embodiment of tracking information.

FIG. 4 illustrates a table including several representative indicators. The first indicator 220 represents one possible tracking portion that may be included in a destination URL that is readable by the URL modifier 106 of FIGS. 1 and 2. In one embodiment, a routing application, such as WebDispatcher available from SAP, reads this information and based on this information may perform data substitution. For example, in the electronic document, prior to the URL modifier 106 personalizing the document, a template URL may be encoded therein, for example, www.dst.com/, (where dst is used as shorthand for destination). Based on information associated with a particular user, a reference table may be used to indicate that upon customization of the document, the tracking portion of the URL ("") should be replaced with the data field 222.

In this embodiment, the electronic document would therefore include the active hyperlink of http://www.dst.com:8090, with additional information appended thereto, such as a Global User ID (GUID), displayed as "?GUID=XX&Target_site=www.TRGT.com", (where trgt is used as shorthand for target). Based on the inclusion of the ":8090" identifier, when the URL is selected, the hyperlink is directed the apparatus 100. In this apparatus 100, the URL modifier 106 thereupon adjusts the URL be replacing original incoming tracking portion "www.dst.com:8090" 222 with the redirection information of "/pwd/www.trgt.com/CRM_tracking" 224. This replacement is performed using the additional information appended to the incoming URL in relation to a look-up table, such as found in the business warehouse or the tracking database.

Figure 5:
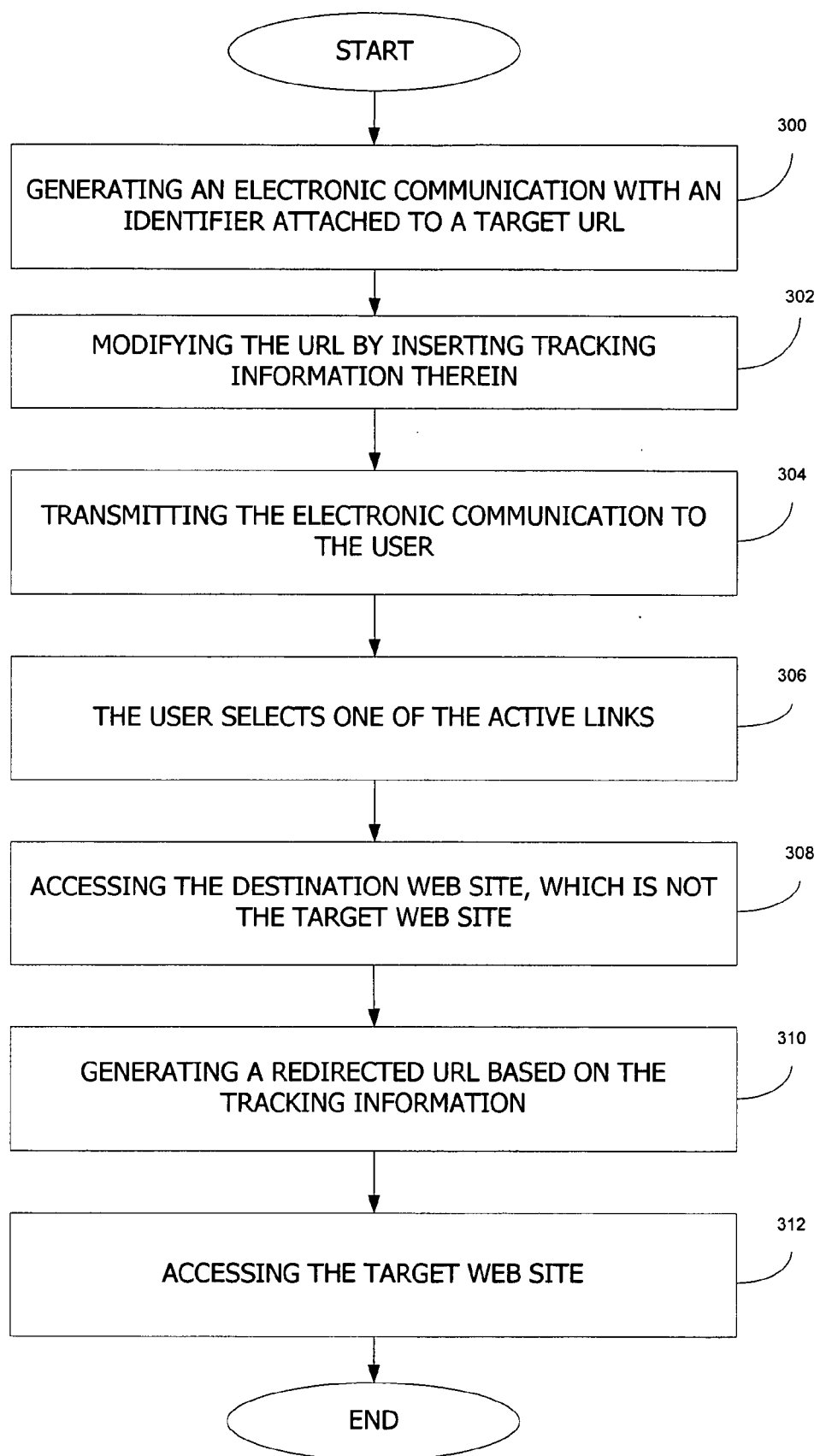
FIG. 5 illustrates a flowchart of the steps of one embodiment of a method for tracking link access in a processing system.

FIG. 5 illustrates the steps of a flowchart of one embodiment of a method of link tracking. In a first step, step 300, during a design mode, the electronic communication document is generated with a corresponding identifier appended to a target URL. In the example, the document includes one or more active hyperlinks, including the hyperlink http://www.target.com/##. The method thereupon converts to an execution mode where in the next step, step 302, the URL is modified to reflect the corresponding tracking, including the insertion of tracking information. In one example, the URL is modified to now reflect access to a destination site that allows for tracking the information. For example, the URL may be modified to hyperlink http://www.destination.com:8090?USER=ID&Target_site=www.target.com.

The next step, step 304, the electronic communication is transmitted to the intended user, as discussed above. The next step, step 306, the user selects one of the hyperlinks, such as clicking or double-clicking on a particular link. Upon selection of the active link, the method proceeds, step 308, to accessing the destination web site, which is not the target web site. The tracking information associated with the incoming data access request is parsed off, as discussed above, and used for not only tracking the incoming active link selection, but also redirection. Therefore, step 310 is the generation of a redirected URL based on the tracking information, including a user identifier included therein. Based on this, the next step, step 312 is accessing the original intended web site, www.target.com.

The method provides for the generation of an electronic communication having the trackable URLs therein. The method further provides for the tracking of the selection of these URLs and the redirection of the access request so the user successfully accesses the intended web site. The tracking information is therein extracted and available for backend processing to monitor and/or track the effectiveness of one or more electronic communication campaigns.

In another embodiment, further level of tracking may be available with a high degree of flexibility with accessible URLS. In a single electronic communication, any reasonable number of active links may be provided. Each of these links may be to different target web sites, which may be owned or operated by one or more entities interested in tracking the information.

Using the above example of pet food, there may be a first web site directed to pets in general, a second site also directed to pets, but different from the first, a third site directed to dog food, a fourth site directed to dog toys, a fifth site directed to dog-friendly hotels, a sixth site directed to local dog-friendly parks, numerous links for cats, and all other types of pets. Therefore, the tracking may include a high number of active links and it can be important to know who clicked which link, and when. The tracking information may be subdivided with different identifiers for different categories and readily modified to include category tracking information embedded with the active links in the electronic documents.

In another embodiment, the tracking of information may be within a hosting site such that the target site and the destination site may be the same. This embodiment may include the apparatus 150 that generates the communications to be separate from the tracking apparatus 100. Furthermore, this embodiment may not need to redirect the URL, but redirection may still be needed if the destination site and the target site are at different domains, as recognized by one having ordinary skill in the art.

Although the preceding text sets forth a detailed description of various embodiments, it should be understood that the legal scope of the invention is defined by the words of the claims set forth below. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should be understood that there exist implementations of other variations and modifications of the invention and its various aspects, as may be readily apparent to those of ordinary skill in the art, and that the invention is not limited by specific embodiments described herein. It is therefore contemplated to cover any and all modifications, variations or equivalents that fall within the scope of the basic underlying principals disclosed and claimed herein.

What is claimed is:

1. An apparatus for tracking incoming link access in a processing system, the apparatus comprising:
   a parser operative to separate a destination universal resource locator (URL) and a first set of tracking information from an incoming access request;
   a URL modifier operative to:
     receive the destination URL and the first set of tracking information from the parser;
     provide a second set of tracking information to a business warehouse coupled to the URL modifier; and
     generate a target URL based on the first set of tracking information and the second set of tracking information;
   a tracking database coupled to the URL modifier, operative to receive the first set of tracking information therefrom to update the tracking database based on the first set of tracking information; and
   a redirector receiving the generated target URL from the URL modifier, wherein the redirector provides an access request for the target URL to be transmitted to a user, the processing of the access request resulting in pushing data from the target URL to the user;
   wherein the first set of tracking information includes an identifier for the accessed target URL and an identifier for at least one category of the tracking database, each of the at least one category representing related interests in the data pushed from the target URL; and
   wherein upon receiving the first set of tracking information, an entry corresponding to the target URL and an entry corresponding to the at least one category of the tracking database are updated to reflect the target URL being accessed.

2. The apparatus of claim 1 further comprising:
   a receiver coupled to the parser such that the receiver receives an incoming user request and generates the destination URL and the first set of tracking information therefrom.

3. The apparatus of claim 2 wherein the receiver receives the incoming user request across a network.

4. The apparatus of claim 1 wherein the business warehouse is coupled to the tracking database and the URL modifier to exchange the first set of tracking information and target URL information between the business warehouse, the tracking database, and the URL modifier.

5. The apparatus of claim 1 further comprising:
   an electronic communication generator coupled to the URL modifier, the generator generating a plurality of electronic communications; and
   the URL modifier receiving the electronic communications and updating the communications by inserting the destination URL and the first set of tracking information therein.

6. The apparatus of claim 5 further comprising:
   a transmitter transmitting at least one of the updated electronic communications to the user.

7. The apparatus of claim 6 wherein the transmitter transmits the updated electronic communications across a network.

8. The apparatus of claim 5 further comprising:
   a business warehouse coupled to the URL modifier, the URL modifier receiving the first set of tracking information therefrom for generating the updated electronic communications.

9. The apparatus of claim 1, wherein the second set of tracking information includes a date and a time of the incoming access request, a location from which the incoming access request is generated, and an amount of time elapsed between a presentation of a link to a user and a selection of the link corresponding to the incoming access request by the user.

10. The apparatus of claim 1, wherein the identifier for the accessed target URL is a tracking object, and each of the at least one category representing the data pushed from the target URL includes a grouping of tracking objects.

11. The apparatus of claim 10, wherein the tracking object groups are each definable and adjustable to varying levels of specificity.

12. A computer-implemented method for tracking incoming link access in a processing system, the method comprising:
   separating, using a parser, a destination universal resource locator (URL) and a first set of tracking information;
   providing the destination URL and the first set of tracking information to a URL modifier;
   accessing a tracking database using the first set of tracking information;
   updating the tracking database based on the first set of tracking information;
   providing a second set of tracking information to a business warehouse coupled to the URL modifier; and
   generating, by the URL modifier, a target URL based on the destination URL, the first set of tracking information, and the second set of tracking information; and
   redirecting a web access call based on the target URL, the web access call pushing data from the target URL to a user;
   wherein the first set of tracking information includes an identifier for the accessed target URL and an identifier for at least one category of the tracking database, each of the at least one category representing related interests in the data pushed from the target URL; and
   wherein said updating the tracking database includes updating both an entry corresponding to the target URL and an entry corresponding to the at least one category of the tracking database.

13. The method of claim 12 further comprising:
   receiving an incoming user request; and
   generating the destination URL and the first set of tracking information therefrom.

14. The method of claim 13 wherein the user request is received across a network.

15. The method of claim 13 wherein the communications are transmitted across a network.

16. The method of claim 12 wherein the step of generating the target URL includes receiving URL information from the business warehouse.

17. The method of claim 12 further comprising:
generating a plurality of electronic communications; and
updating the communications by inserting the destination URL and the first set of tracking information therein.

18. The method of claim 17 further comprising:
transmitting at least one of the updated electronic communications to a user.

19. The method of claim 17 further comprising:
prior to updating the communications, receiving the first set of tracking information from a business warehouse.

20. An apparatus for tracking incoming link access in a processing system, the apparatus comprising:
an electronic communication generator coupled to a URL modifier, the generator generating a plurality of electronic communications;
the URL modifier updating the electronic communications by inserting a destination universal resource locator (URL) and a first set of tracking information therein;
the URL modifier providing a second set of tracking information to a business warehouse coupled to the URL modifier;
a parser operative to separate a destination URL and the first set of tracking information received from an incoming access request;
a tracking database coupled to the URL modifier, operative to receive the first set of tracking information from the URL modifier, updating the tracking database based on the first set of tracking information; and
a redirector receiving a target URL from the URL modifier, wherein the redirector provides an access request for the target URL to be transmitted to a user, the processing of the access request resulting in pushing data from the target URL to the user;
wherein the first set of tracking information includes an identifier for the accessed target URL and an identifier for at least one category of the tracking database, each of the at least one category representing related interests in the data pushed from the target URL; and
wherein upon receiving the first set of tracking information, an entry corresponding to the target URL and an entry corresponding to the at least one category of the tracking database are updated to reflect the target URL being accessed.

21. The apparatus of claim 20 further comprising:
a transmitter transmitting at least one of the updated electronic communications to the user.

22. The apparatus of claim 21 further comprising:
a receiver coupled to the parser such that the receiver receives an incoming user request and generates the destination URL and the first set of tracking information therefrom.

23. The apparatus of claim 22 wherein the transmitter transmits the updated electronic communications and the receiver receives the incoming user request across a network.

24. The apparatus of claim 23 wherein the business warehouse is coupled to the tracking database and the URL modifier to exchange the first set of tracking information and target URL information between the business warehouse, the tracking database, and the URL modifier, wherein the URL modifier receives the tracking information therefrom for generating the updated electronic communications.

* * * * *